US008526767B2

(12) United States Patent
Bowens

(10) Patent No.: US 8,526,767 B2
(45) Date of Patent: Sep. 3, 2013

(54) GESTURE RECOGNITION

(75) Inventor: Alan Bowens, Southampton (GB)

(73) Assignee: Atmel Corporation, San Jose, CA (US)

( * ) Notice: Subject to any disclaimer, the term of this patent is extended or adjusted under 35 U.S.C. 154(b) by 1010 days.

(21) Appl. No.: 12/254,043

(22) Filed: Oct. 20, 2008

(65) Prior Publication Data

US 2009/0273571 A1 Nov. 5, 2009

Related U.S. Application Data

(60) Provisional application No. 61/049,453, filed on May 1, 2008.

(51) Int. Cl.
*G06K 9/22* (2006.01)

(52) U.S. Cl.
USPC .......................................... 382/315; 345/173

(58) Field of Classification Search
USPC ...... 382/312, 314, 315; 348/14.03; 715/700, 715/719; 345/157, 173–177, 181
See application file for complete search history.

(56) References Cited

U.S. PATENT DOCUMENTS

| | | | |
|---|---|---|---|
| 3,593,115 A | | 7/1971 | Dym et al. |
| 5,133,076 A | * | 7/1992 | Hawkins et al. ............... 708/141 |
| 5,396,443 A | * | 3/1995 | Mese et al. ..................... 713/321 |
| 5,570,113 A | * | 10/1996 | Zetts .............................. 345/173 |
| 5,650,597 A | | 7/1997 | Redmayne |
| 5,730,165 A | | 3/1998 | Philipp |
| 5,825,352 A | | 10/1998 | Bisset et al. |
| 6,028,271 A | | 2/2000 | Gillespie et al. |
| 6,297,811 B1 | | 10/2001 | Kent et al. |
| 6,414,671 B1 | | 7/2002 | Gillespie et al. |
| 6,452,514 B1 | | 9/2002 | Philipp |
| 6,466,036 B1 | | 10/2002 | Philipp |
| 6,608,619 B2 | * | 8/2003 | Omura et al. .................. 345/175 |
| 6,750,852 B2 | | 6/2004 | Gillespie et al. |
| 6,888,536 B2 | | 5/2005 | Westerman et al. |
| 7,663,607 B2 | | 2/2010 | Hotelling |
| 7,875,814 B2 | | 1/2011 | Chen |
| 7,920,129 B2 | | 4/2011 | Hotelling |
| 8,031,094 B2 | | 10/2011 | Hotelling |
| 8,031,174 B2 | | 10/2011 | Hamblin |
| 8,040,326 B2 | | 10/2011 | Hotelling |
| 8,049,732 B2 | | 11/2011 | Hotelling |
| 8,179,381 B2 | | 5/2012 | Frey |
| 8,368,653 B2 | * | 2/2013 | Han et al. ....................... 345/173 |

(Continued)

FOREIGN PATENT DOCUMENTS

WO  WO 2012/129247  9/2012

OTHER PUBLICATIONS

U.S. Appl. No. 61/454,936, Mar. 21, 2011, Myers.
U.S. Appl. No. 61/454,950, Mar. 21, 2011, Lynch.

(Continued)

*Primary Examiner* — Jason M Repko
*Assistant Examiner* — Shervin Nakhjavan
(74) *Attorney, Agent, or Firm* — Baker Botts LLP

(57) ABSTRACT

A state machine gesture recognition algorithm for interpreting streams of coordinates received from a touch sensor. The gesture recognition code can be written in a high level language such as C and then compiled and embedded in a microcontroller chip, or CPU chip as desired. The gesture recognition code can be loaded into the same chip that interprets the touch signals from the touch sensor and generates the time series data, e.g. a microcontroller, or other programmable logic device such as a field programmable gate array.

14 Claims, 11 Drawing Sheets

(56) References Cited

U.S. PATENT DOCUMENTS

| | | |
|---|---|---|
| 2002/0015024 A1 | 2/2002 | Westerman et al. |
| 2003/0214481 A1* | 11/2003 | Xiong ........................... 345/157 |
| 2005/0041018 A1 | 2/2005 | Philipp |
| 2006/0066582 A1 | 3/2006 | Lyon et al. |
| 2006/0097991 A1 | 5/2006 | Hotelling |
| 2006/0132460 A1* | 6/2006 | Kolmykov-Zotov et al. . 345/173 |
| 2006/0250377 A1 | 11/2006 | Zadesky et al. |
| 2007/0046643 A1* | 3/2007 | Hillis et al. ................... 345/173 |
| 2007/0097096 A1* | 5/2007 | Rosenberg ................... 345/173 |
| 2007/0152979 A1 | 7/2007 | Jobs et al. |
| 2007/0152984 A1 | 7/2007 | Ording et al. |
| 2007/0176906 A1 | 8/2007 | Warren |
| 2007/0177804 A1 | 8/2007 | Elias et al. |
| 2007/0247443 A1 | 10/2007 | Philipp |
| 2007/0257890 A1 | 11/2007 | Hotelling et al. |
| 2007/0257894 A1 | 11/2007 | Philipp |
| 2007/0265081 A1* | 11/2007 | Shimura et al. ................. 463/37 |
| 2007/0279395 A1 | 12/2007 | Philipp |
| 2007/0291007 A1* | 12/2007 | Forlines et al. ............... 345/173 |
| 2007/0291009 A1* | 12/2007 | Wright et al. ................. 345/173 |
| 2008/0165141 A1* | 7/2008 | Christie ........................ 345/173 |
| 2008/0309626 A1* | 12/2008 | Westerman et al. .......... 345/173 |
| 2009/0315854 A1 | 12/2009 | Matsuo |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |

OTHER PUBLICATIONS

U.S. Appl. No. 61/454,894, Mar. 21, 2011, Rothkopf.

* cited by examiner

GESTURE RECOGNITION

CROSS-REFERENCES TO RELATED APPLICATIONS

This application claims the benefit under 35 U.S.C. §119 (e) of U.S. Provisional Application Ser. No. 61/049,453 filed May 1, 2008.

BACKGROUND OF THE INVENTION

The invention relates to gesture recognition in particular gesture recognition by processing of time series of positional inputs received by a two-dimensional (2D) touch sensor, such as a capacitive or resistive touch sensor. The invention may also be applied to one-dimensional (1D) touch sensors, and the principles could also be applied to three-dimensional sensors. It may also be applied to proximity sensors, where no physical contact, i.e. touch, with a sensing surface is involved. The invention can be applied to sensing surfaces operable by a human finger, or a stylus.

1D and 2D capacitive and resistive touch sensors have been in widespread use for many years. Examples include the screens of personal digital assistants (PDAs), MP3 audio player controls, mobile phone keypads and/or displays, and multimedia devices. The touchpad in notebook computers provided in place of a mouse is another form of 2D capacitive touch sensor. 2D sensors are also provided in many domestic appliances, so-called "white goods", such as ovens and blenders.

Detailed descriptions of 2D capacitive sensors have been given many times, for example in patents and patent applications with the inventor Harald Philipp such as US 2005/0041018 A1, US 2007/0247443 A1, US 2007/0257894 A1, and US 2007/0279395 A1, the contents of which are incorporated herein in their entirety.

Other prior art examples of touch screens are as follows.

U.S. Pat. No. 3,593,115 shows a touch element having triangulated shapes for determining object position. However this scheme requires numerous secondary electrode connections as well as two or more layers of construction, increasing construction costs and reducing transparency.

U.S. Pat. No. 5,650,597 shows a 2D sensing method which in its active area requires only one layer but requires large numbers of electrode connections. Resistive strips resolve one axis of position, and the accuracy is dependent on the tolerance of large numbers of resistive strips. This method however does suppress hand shadow effects.

U.S. Pat. No. 6,297,811 describes a touch screen using triangulated wire outline electrode shapes to create field gradients. However this patent suffers from the problem that it is difficult to scale up the screen size, as the number of electrode connections to a sensing circuit is one per triangle. It is desirable to dramatically reduce the number of connections in order to reduce cost and simplify construction. Also it is desirable to use solid shapes rather than wire outlines which are more expensive to construct. This method however does suppress hand shadow effects.

Gesture recognition has also been used for many years in such devices. An early example is character recognition in PDAs, such as the original machines from Palm Inc. Tracking finger motion, and single and double taps on a notebook touchpad is another long used example. More recently, gesture recognition has been incorporated into handheld devices such as the Apple iPhone®. Prior art patent publications on touch screens that involve gesture recognition are also large in number, with significant numbers of publications from Synaptics, Inc. and also more recently Apple Computer, Inc, for example.

US 2007/152984 A1 assigned to Apple Computer, Inc. discloses a portable communication device with multi-touch input which detects one or more multi-touch contacts and motions and performs one or more operations on an object based on the one or more multi-touch contacts and/or motions.

US 2002/015024 A1 assigned to University of Delaware discloses simultaneously tracking multiple finger and palm contacts as hands approach, touch, and slide across a proximity-sensor. Segmentation processing extracts shape, position and surface proximity features for each contact and a persistent path tracker is used to detect individual contact touchdown and liftoff. Combinatorial optimization modules associate each contact's path with a particular fingertip, thumb, or palm of either hand on the basis of biomechanical constraints and contact features. Classification of intuitive hand configurations and motions enables unprecedented integration of typing, resting, pointing, scrolling, 3D manipulation, and handwriting into a versatile, ergonomic computer input device.

U.S. Pat. No. 5,825,352 discloses a touch panel which is capable of detecting multiple touches simultaneously. In an xy electrode array, maxima and minima are identified in each of the x and y signals, wherein maxima are designated as finger touches. Peak and valley data in the x and y directions are then interpolated to identify the location of one or more fingers on the sensor array.

U.S. Pat. No. 6,028,271, U.S. Pat. No. 6,414,671 and U.S. Pat. No. 6,750,852 are related patents assigned to Synaptics, Inc. which disclose gesture recognition of an object on a touch-sensor pad and for cursor motion. Tapping, drags, pushes, extended drags and variable drags gestures are recognized by analyzing the position, pressure, and movement of the conductive object on the sensor pad during the time of a suspected gesture, and signals are sent to a host indicating the occurrence of these gestures.

US2007/176906 A1 assigned to Synaptics, Inc. discloses a touch sensor having a signal processor adapted to distinguish between three gestures based on different finger motions on the sensing device by providing a workflow with an idle state and three gesture-specific states referred to as first, second and third result states, as illustrated in FIG. 5 of US2007/176906 A1.

Generally, the raw output from the 2D touch sensor will be a time series of x, y coordinates, which are then processed by software, or firmware generated from higher level software, to distinguish the nature of the gesture that has been input. Generally, the raw data is split into contiguous touch segments and then processed to determine what if any gestures can be deduced. The processing of the raw data to identify the gestures may be carried out in the same chip as generates the raw data, or the raw data may be exported to an external chip, for example by transmission over a communication bus to the device's central processing unit (CPU). The former approach is preferred by Synaptics, the latter by Apple as exemplified by US 2006/0066582 A1.

Most of the patent literature is unspecific about how the raw time series data are converted into gestures. The straightforward approach is to write appropriate high level code, for example in C or another suitable programming language, in which the interpretation of the time series data is analyzed using conditional statements, such as if . . . then . . . else.

However, it is difficult to reliably and efficiently add code to identify a new gesture into an existing block of code for distinguishing between a significant number of gestures, for example at least 3 or 4, perhaps 10 to 20. Testing of the code is a particular difficulty. This is because in general at any intermediate point in a time series of x,y,t data the input may relate to a plurality of possible gestures, thereby making the coding for recognizing one gesture generally dependent on or linked to the coding for recognizing another gesture.

SUMMARY OF THE INVENTION

The invention solves this problem by adopting a state machine approach to designing and writing the gesture recognition algorithm. In particular, the invention relates to a touch sensor device comprising an at least one-dimensional sensor arranged to output a sense signal responsive to proximity of an object, a position processing unit for calculating a position of an interaction with the sensitive area from an analysis of the sense signals and output a time series of data indicative of interaction positions on the sensor, and a gesture processing unit operable to analyze the time series data to distinguish one or more gesture inputs therefrom, wherein the gesture processing unit is coded with gesture recognition code comprising a plurality of linked state modules. The invention also relates to a corresponding signal processing method.

The gesture recognition code can be written in a high level language such as C and then compiled and embedded in a microcontroller chip, or CPU chip as desired. Preferably, the gesture recognition code is loaded into the same chip that interprets the touch signals from the screen and generates the time series data, e.g. a microcontroller, or other programmable logic device such as a field programmable gate array (FPGA). This approach has been used to create reliable testable code both for single-touch data input screens and also multi-touch data input screens. A single-touch screen is one which assumes only one simultaneous touch of the screen, and is designed to output only one x,y coordinate at any one time. A multi-touch screen is one that can sense multiple simultaneous touches, for example up to 2 or 3 simultaneous touches.

The state machine includes an idle state module which is the start state, and also the state which is returned to after a gesture interpretation state module has been exited.

Responsive to a touch, the idle state passes control to a touch state.

In a multi-touch environment, the state machine is implemented in the second embodiment described below such that there are multiple touch states, one for a single touch, one for a double touch, one for a triple touch etc with control passing to the appropriate touch state based on the number of simultaneous touches defined by the time series data at the time.

Although the above approach for handling multitouch gestures by having two-touch and three-touch states linked to one touch states operates well, redesigning the state machine to, for example, add a new multitouch gesture is difficult in view of the increasingly complex web of states and transitions. This problem is addressed by a fourth embodiment of the invention described below according to which there is provided a plurality of state machines limited to single-touch gesture recognition. If the gesture recognition code is configured to recognize gestures having up to, say 3 simultaneous touches, then 3 such single-touch state machines are provided. Further state machines are provided for multi-touch gesture recognition, each catering for a certain number of simultaneous touches, so there is a two-touch state machine and optionally a three-touch state machine, and further optionally additional state machines for still higher numbers of simultaneous touches. A key advantage of this approach is that the same code base is used for handling single touches, and each of 2-, 3- or higher numbers of simultaneous touches are processed using separate additional code embodied in separate state machines.

A touch is usually only output as a valid touch, if certain criteria are satisfied, typically that there are a succession of touch at a stable x,y location or x,y region over multiple time sample increments. If a touch of a duration longer than a threshold duration is sensed in the touch state, then control flow passes to a press state module, wherein the press state is for handling longer touches. The press state is preferably a superstate comprising multiple sub-states to distinguish between different durations of press and/or to allow a very long press to be interpreted as being repeat presses, which may be useful for alphanumeric key entry applications for example.

The state machine preferably also has a plurality of state modules for interpreting higher level gestures, such as one or more states for interpreting double taps, flicks, drags and any other gestures. The gestures include those specifically described in this document as well as other gestures known in the art, specifically all those disclosed in the above-referenced prior art documents.

The invention provides in one aspect a touch sensor device comprising: a sensor having a sensitive area extending in at least one-dimension and arranged to output sense signals responsive to proximity of an object to the sensitive area; a position processing unit operable to calculate positions of interactions with the sensitive area from an analysis of the sense signals, and output a time series of data indicative of the interaction positions on the sensor, and thus touches; and a gesture processing unit operable to analyze the time series data to distinguish one or more gesture inputs therefrom, wherein the gesture processing unit is coded with gesture recognition code comprising a plurality of linked state modules.

Further aspects of the invention relate to the gesture processing unit on its own and the gesture processing unit in combination with the position processing unit, but without the sensor.

The plurality of state modules preferably includes an idle state module and a plurality of gesture interpretation state modules, wherein the idle state module is entered at the start of operation, and is returnable to from at least some of the gesture interpretation state modules. The plurality of gesture interpretation state modules may include a touch state module for single touches, and wherein, responsive to a touch, the idle state passes control to the touch state.

In some embodiments, the plurality of gesture interpretation state modules includes at least one multitouch state module operable to process multiple simultaneous touches, and wherein the gesture processing unit is operable to pass control to the appropriate touch state module based on the number of simultaneous touches defined by the time series data at the time. A multitouch state module for each of two simultaneous touches and three simultaneous touches may be provided, and optionally also higher numbers of touches.

The plurality of gesture interpretation state modules may advantageously include a press state module to which control can pass from a touch state module if a touch of a duration longer than a threshold duration is sensed in the touch state module. The press state is preferably a superstate comprising multiple sub-states to distinguish between different durations of press.

In some embodiments, the plurality of gesture interpretation state modules includes a plurality of state modules operable to recognize motion related gestures derived from one or more moving touches. In other embodiments, only static gestures, such as press, tap and double tap are catered for.

The best mode of implementing multitouch gesture interpretation according to the invention provides gesture recognition code configured to recognize gestures having up to N simultaneous touches, wherein N is at least 2, and comprises N single-touch state machines operable to recognize only single touch gestures, and N−1 multi-touch state machines each operable to recognize only n-touch gestures, wherein n=2 to N.

The position processing unit and the gesture processing unit may be accommodated in, and run on, a single integrated circuit, for example a microcontroller. Alternatively, the position processing unit may be accommodated in, and run on, a first integrated circuit, such as a microcontroller, and the gesture processing unit accommodated in, and run on, one or more separate integrated circuits, such as a personal computer or other complex system having its own central processing unit, graphics processing unit and/or digital signal processor with associated memory and bus communications.

The invention provides in another aspect a method of recognizing gestures from a time series of touch data comprising coordinates of interaction positions on a touch sensor, the method comprising: receiving touch coordinates labeled with, or ordered by, time; analyzing the touch coordinates in a state machine comprising a plurality of linked state modules to recognize any one of a plurality of defined gestures therefrom; and outputting the recognized gestures.

The invention provides in a still further aspect a single integrated circuit having a memory on which is loaded the above-referenced gesture state machine and which is operable to carry out the method of gesture recognition defined thereby.

The invention provides in yet another aspect a computer having a memory on which is loaded the above-referenced gesture state machine and which is operable to carry out the method of gesture recognition defined thereby.

It will be appreciated that the gesture state machine approach for gesture recognition can be applied to any hardware platform. Capacitive touch sensors, in particular one-dimensional and two-dimensional capacitive touch sensors are one important sensor type which can provide a hardware platform for a gesture recognition state machine according to the invention. In particular, the invention is equally applicable to so-called passive or active capacitive sensing techniques.

Passive capacitive sensing devices rely on measuring the capacitance of a sensing electrode to a system reference potential (earth). The principles underlying this technique are described in U.S. Pat. No. 5,730,165 and U.S. Pat. No. 6,466,036, for example. In broad summary, passive capacitive sensors employ sensing electrodes coupled to capacitance measurement circuits. Each capacitance measurement circuit measures the capacitance (capacitive coupling) of its associated sensing electrode to a system ground. When there is no pointing object near to the sensing electrode, the measured capacitance has a background or quiescent value. This value depends on the geometry and layout of the sensing electrode and the connection leads to it, and so on, as well as the nature and location of neighboring objects, e.g. the sensing electrodes proximity to nearby ground planes. When a pointing object, e.g. a user's finger, approaches the sensing electrode, the pointing object appears as a virtual ground. This serves to increase the measured capacitance of the sensing electrode to ground. Thus an increase in measured capacitance is taken to indicate the presence of a pointing object. U.S. Pat. No. 5,730,165 and U.S. Pat. No. 6,466,036 are primarily directed to discrete (single button) measurements, and not to 2D position sensor applications. However the principles described in U.S. Pat. No. 5,730,165 and U.S. Pat. No. 6,466,036 are readily applicable to 2D capacitive touch sensors (2DCTs), e.g. by providing electrodes to define either a 2D array of discrete sensing areas, or rows and columns of electrodes in a matrix configuration.

Active 2DCT sensors are based on measuring the capacitive coupling between two electrodes (rather than between a single sensing electrode and a system ground). The principles underlying active capacitive sensing techniques are described in U.S. Pat. No. 6,452,514. In an active-type sensor, one electrode, the so called drive electrode, is supplied with an oscillating drive signal. The degree of capacitive coupling of the drive signal to the sense electrode is determined by measuring the amount of charge transferred to the sense electrode by the oscillating drive signal. The amount of charge transferred, i.e. the strength of the signal seen at the sense electrode, is a measure of the capacitive coupling between the electrodes. When there is no pointing object near to the electrodes, the measured signal on the sense electrode has a background or quiescent value. However, when a pointing object, e.g. a user's finger, approaches the electrodes (or more particularly approaches near to the region separating the electrodes), the pointing object acts as a virtual ground and sinks some of the drive signal (charge) from the drive electrode. This acts to reduce the strength of the component of the drive signal coupled to the sense electrode. Thus a decrease in measured signal on the sense electrode is taken to indicate the presence of a pointing object.

It will be appreciated that there are several other touch sensing technologies, such as those based on resistive screens, which typically operate with stylus input, and technologies developed for large areas, such as those based on ultrasonics or other acoustic techniques, and those based on total internal reflection, or other optical techniques. All of these touch technologies may benefit from the present invention.

It is noted that the term of art "state machine" is used throughout this document. A synonym is finite state machine (FSM), the acronym FSM appearing in some of the figures.

BRIEF DESCRIPTION OF THE DRAWINGS

For a better understanding of the invention, and to show how the same may be carried into effect, reference is now made by way of example to the accompanying drawings.

DETAILED DESCRIPTION

Figure 1:
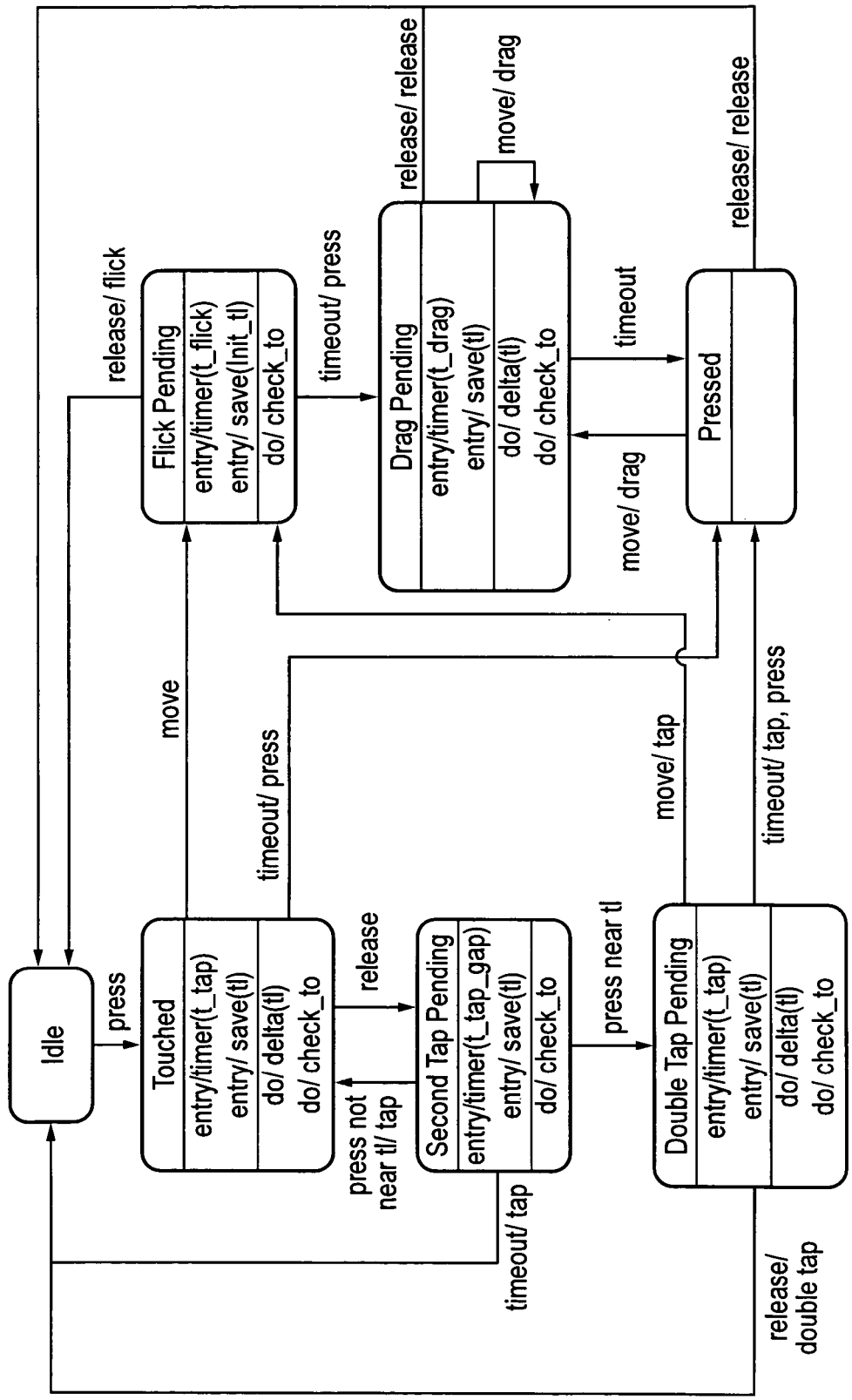
FIG. 1 illustrates a gesture recognition state machine according to a first embodiment.

Before describing embodiments of the invention, we first define each of the gestures referred to in the detailed description of the embodiments.

Tap: A tap happens when the user quickly touches and releases the touch surface. No significant movement takes place while the user's finger is on the touch surface. It is characterized by a short touch duration. This could be used, for example, to activate a hyperlink on a displayed web page.

Double Tap: A double tap happens when the user quickly touches and releases the touch surface twice in quick succession. No significant movement takes place while the user's finger is on the touch surface, or between successive touches. It is characterized by short touch durations, and a short gap between the first release and the second press. This could be used, for example, to select a word in a displayed document.

Press: A press happens when the user touches and holds the touch surface. No significant movement takes place while the user's finger is on the touch surface. This could be used, for example, to select a number from a displayed numeric keypad. The same mechanism could be used to auto-repeat the selected number if the user continues to press on the displayed number.

Flick: A flick happens when the user quickly touches the touch surface, moves a short distance, and releases touch. It is characterized by a short touch duration. This could be used, for example, to display the next in a sequence of images.

Drag: A drag happens when the user touches the touch surface, moves their finger across the surface, and releases touch. It is characterized by a large movement across the touch surface. Depending on the application, multiple drag events may be generated as the user moves their finger. This could be used, for example, to select a sentence in a displayed document.

Pinch: A pinch happens when the user places two fingers on the touch surface, and then moves them towards each other. This could be used, for example, to zoom out on a displayed image.

Stretch: A stretch happens when the user places two fingers on the touch surface, and then moves them away from each other. This could be used, for example, to zoom in on a displayed image.

Rotate: A rotate operation happens when the user places two fingers on the touch surface, and then rotates them relative to each other. This could be used, for example, to rotate a displayed image.

Before describing embodiments of the invention, we first define each of the events referred to in the detailed description of the embodiments. These events are those acted upon by the state machines embodying the invention described further below. It is noted that in some embodiments the state machine can generate simultaneous multiple events in response to certain user actions.

Tap: A tap event is generated when the user makes a tap gesture.

Double Tap: A double tap event is generated when the user makes a double tap gesture.

Press: A press event is generated when the user touches the touch surface and leaves their finger stationary.

Short Press: A short press event is generated after a press event, when the user has continued to leave their finger stationary for a period.

Long Press: A long press event is generated after a short press event, when the user has continued to leave their finger stationary for a period.

Repeat Press: A repeat press event is generated after a long press event, when the user has continued to leave their finger stationary for a period. If they continue to leave their finger stationary, repeat press events will be generated at regular intervals.

Release: A release event is generated when the user removes their finger(s) from the touch surface.

Flick: A flick event is generated when the user makes a flick gesture.

Drag: A drag event is generated when the user makes a drag gesture.

Multitouch (or Dual touch): A multitouch (or dual touch) event is generated when the user presses the touch surface with two fingers.

Pinch: A pinch event is generated when the user makes a pinch gesture.

Stretch: A stretch event is generated when the user makes a stretch gesture.

Rotate: A rotate event is generated when the user makes a rotate gesture.

FIG. 1 shows a state machine for gesture recognition according to a first embodiment, which is limited to processing gestures made up of single touches. In other words, multitouch gestures are not catered for in this embodiment. The supported gestures are: tap; press; double tap; flick; and drag. These 5 gestures are recognized in the state machine by traversing 7 states interconnected by approximately 17 transitions, as illustrated in the figure. The states can be further subdivided into those relating to static touches, namely press, tap and double tap in this example, and those related to moving touches, namely flick and drag in this example.

The Idle state is now described. The Idle state occurs whenever a user is not touching the touch surface. There are no actions triggered by entering this state, and no actions performed while in this state. The Idle state will undergo a transition into a Touched state if the user presses the touch surface with one finger. The Idle state has no parameters, and there are no timing calculations associated with the Idle state.

The Touched state is now described. The Touched state occurs when a user has touched the touch surface. When the Touched state is entered a timeout is started, i.e. a timer is set running which expires after a preset time. This is used to distinguish between short duration gestures such as flicks and taps, and long duration gestures such as a press. The initial touch location is stored. This is used to decide if the user has moved their finger. When in the Touched state the timeout expiry is checked, and the distance moved from the initial touch location is calculated. If the timeout expires, the state machine undergoes a transition by generating a press event and then enters the Pressed state. If the user moves by more than a specified distance from the initial touch location, the state machine enters the Flick Pending state. If the user releases their touch, the state machine enters the Second Tap Pending state. Subsequent actions will determine if a tap, double tap, or other gesture is later generated. The timeout parameter in the Touched state determines how long the user has to remove their finger, potentially generating a tap event. The movement parameter in this state determines by how much the user must move their finger to enter the Flick Pending state. The maximum time permitted from the initial touch in order to generate an event in this state is the timeout period.

The Second Tap Pending state is now described. The Second Tap Pending state occurs after a user has tapped the touch surface. On entry a timeout is started. This is used to decide if the user has made a tap gesture. The initial touch location is stored. This is used to decide if the user is making a double tap gesture. The timeout expiry is checked. If the timeout expires, a tap event is generated and the state machine enters the Idle state. This means that the user had tapped the surface once, but not twice within the allowed time interval. If the user presses the touch surface with one finger, the distance of the second touch from the first is calculated. If it is less than a specified value, the state machine enters the Double Tap Pending state, as the user may be doing a double tap. If the distance between the first and second touches is more than the specified value, the state machine generates a tap event (for the previous tap gesture) and re-enters the Touched state as illustrated. The timeout parameter in the Second Tap Pending state determines how long after the user releases a touch a tap event is generated. If the user touches the surface again before the timeout expires, a double tap event could potentially be generated. The maximum time permitted from initial touch to generate an event in this state is the sum of the timeout periods for the Touch state and the Second Tap Pending state.

The Double Tap Pending state is now described. The Double Tap Pending state occurs when the user has tapped the touch surface and then pressed it again. On entry into the state, a timeout is started. This is used to decide if the user is making a double tap gesture. The initial touch location is also stored. This is used to decide if the user has moved their finger. While in the state, the timeout expiry is checked and the distance moved from the initial touch location is calculated. If the timeout expires, tap and press events are generated and the state machine enters the Pressed state. If the user moves by more than a specified distance from the initial touch location, the state machine generates a tap event and enters the Flick Pending state. This is because the user has tapped once, and their potential second tap is now a potential flick. If the user releases their touch, the state machine generates a double tap event and enters the Idle state. This is because the user completed both taps inside the specified time and distance limits. The timeout parameter in this state determines how long the user has to remove their finger to generate a double tap event. If the timeout expires, it is assumed that the user tapped and then touched and held the surface. The movement parameter in this state determines by how much the user must move their finger to enter the Flick Pending state. The maximum time permitted from initial touch to generate an event in this state is the sum of the timeout periods for the Touch, Second Tap Pending and Double Tap Pending states.

The Flick Pending state is now described. The Flick Pending state occurs when the user has pressed the touch surface and moved their finger over the surface. When the state is entered a timeout is started. This is used to decide if the user is making a flick or a drag gesture. The initial touch location is also stored on entry. This will be passed on to the Drag Pending processing if required. While in this state, the timeout expiry is checked. If the timeout expires, a press event is generated and the state machine enters the Drag Pending state. This is because the user has not released touch within the time used to distinguish flick and drag operations. If the user releases their touch, the state machine generates a flick event and enters the Idle state. This is because the user completed their movement inside the specified time limit. The timeout parameter in this state determines how long the user has to remove their finger to generate a flick event. If the timeout expires, it is assumed that the user is performing a drag operation. The maximum time from initial touch to generate an event in this state is the sum of the timeout periods from the Touched state and the Flick Pending states.

The Drag Pending state is now described. The Drag Pending state occurs when the user has pressed the touch surface and moved their finger over the surface and the movement has lasted longer than a flick duration. On entry into this state, a timeout is started. This is used to decide if the user has become stationary. The initial touch location is also stored on entry. This is used to decide if the user has moved their finger. While in this state, the timeout expiry is checked and the distance moved from the initial touch location is calculated. If the timeout expires, the state machine enters the Pressed state. This is because the user has been stationary for too long. If the user moves by more than a specified distance from the initial touch location, the state machine generates a drag event. If the user releases their touch, the state machine generates a release event and enters the Idle state. The timeout parameter in this state determines for how long the user's finger must be stationary before moving to the Pressed state. The movement parameter in this state determines by how much the user must move their finger to generate a drag event. The maximum time permitted from initial touch to generate an event in this state is the sum of the timeouts for the Touched, Flick Pending and Drag Pending states.

The Pressed state is now described. The Pressed state occurs when a user has pressed the touch surface and been stationary for some time. On entry into this state, the initial touch location is stored. This is used to decide if the user has moved their finger. While in this state, the distance moved from the initial touch location is calculated. If the user moves by more than a specified distance from the initial touch location, a drag event is generated and the state machine enters the Drag Pending state. If the user releases their touch, the state machine generates a release event and enters the Idle state. The movement parameter in this state determines by how much the user must move their finger to generate a drag event and enter the Drag Pending state. There is no limit on how long it could take before an event is generated in this state.

It will be understood that a simplified version of the first embodiment could be envisaged in which the support for the motion related gestures, namely flick and drag, is omitted.

Figure 2:
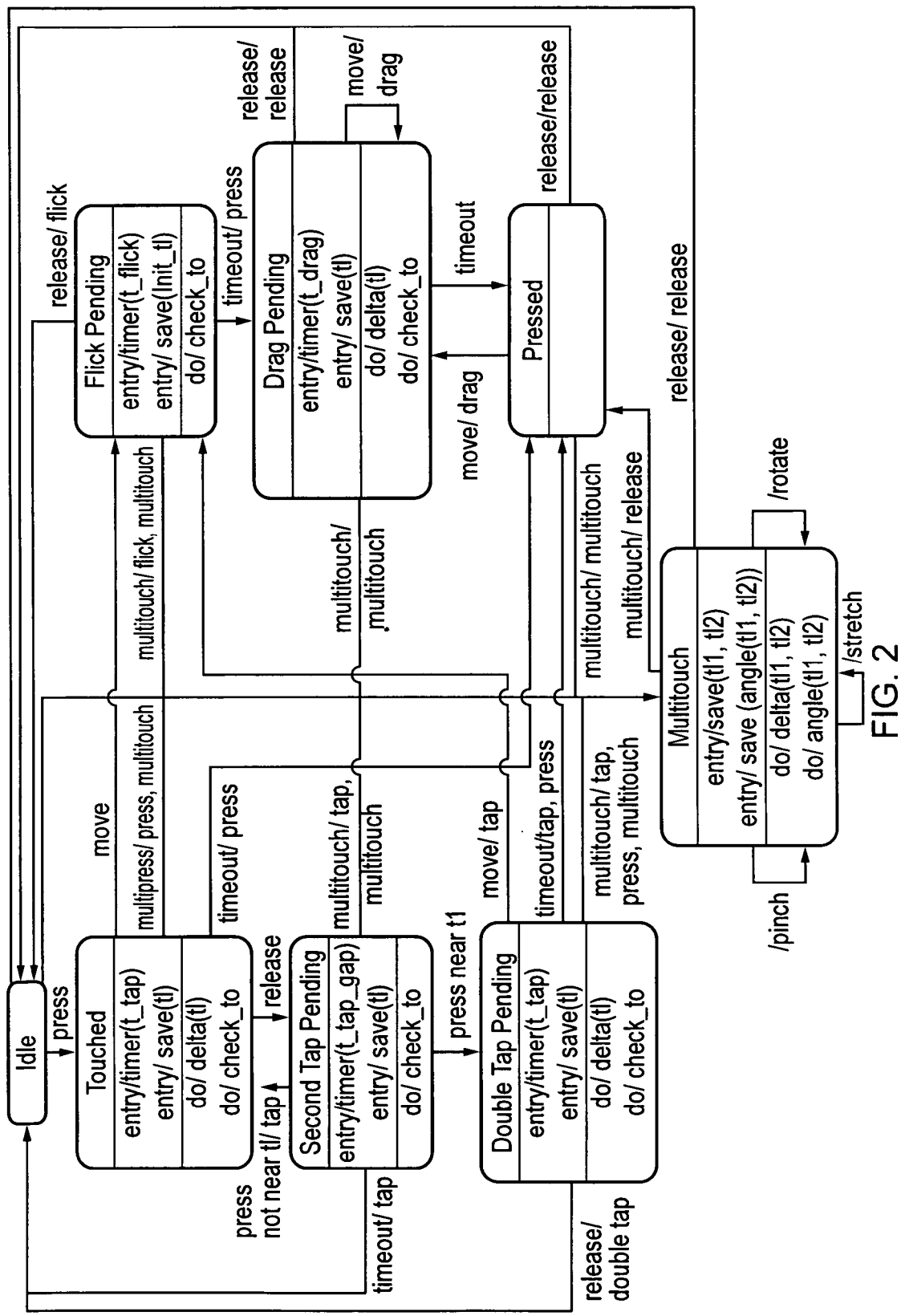
FIG. 2 illustrates a gesture recognition state machine according to a second embodiment.

FIG. 2 shows a state machine for gesture recognition according to a second embodiment, which may be viewed as a development of the first embodiment expanded to cater for multitouch gestures. The supported gestures are the same 5 single touch gestures as in the first embodiment, and in addition 3 multi-touch gestures, which are pinch, rotate and stretch. The multitouch capability is provided by one additional state, the Multitouch state, and approximately 11 additional transitions, as illustrated in the figure. This embodiment is now described with reference to its modifications in relation to the first embodiment.

The additional state of Multitouch (or Dual touch) state is first described. The Multitouch state occurs when the user has put two fingers on the touch surface. On entry, the initial touch locations are stored as well as the angle between the initial touch locations. While in this state, the separation between the two current touch locations is calculated as well as the angle between the touch locations. If the user releases both fingers, the state machine undergoes a transition by generating a release event and enters the Idle state. If the user releases one, or more generally all but one, finger, the state machine enters the Pressed state. If the touch separation increases by more than a specified amount from the initial touch separation, a stretch event is generated. If the touch separation decreases by more than a specified amount from the initial touch separation, a pinch event is generated. If the angle between the touch locations changes by more than a specified amount from the initial angle, a rotate event is generated. It is noted that the state machine can generate multiple events in this state, namely, stretch and rotate, or pinch and rotate. The angle parameter in this state determines by how much the angle between the touch locations must change to generate a rotate event. The stretch threshold parameter in this state determines by how much the separation between the two touch locations must increase to generate a stretch event. The pinch threshold parameter in this state determines by how much the separation between the two touch locations must decrease to generate a pinch event. There is no limit on how long it could take before an event is generated in this state.

From the Idle state there is an additional transition to the Multitouch state. This occurs if the user presses the touch surface with two fingers, in which case the state machine generates a multitouch event and enters the Multitouch state.

From the Touched state there is an additional transition to the Multitouch state. This occurs if the user places a second finger on the touch surface, in which case the state machine generates press and multitouch events and enters the Multitouch state.

From the Second Tap Pending state there is an additional transition to the Multitouch state. This occurs if the user presses the touch surface with two fingers, in which case the state machine generates tap and multitouch events and enters the Multitouch state. This indicates that there was a single tap followed by a multitouch.

From the Double Tap Pending state there is an additional transition to the Multitouch state. This occurs if the user presses the touch surface with two fingers, in which case the state machine generates tap, press, and multitouch events and enters the Multitouch state. This indicates that there was a single tap, a press, and then a multitouch.

From the Flick Pending state there is an additional transition to the Multitouch state. This occurs if the user presses the touch surface with two fingers, in which case the state machine generates flick and multitouch events and enters the Multitouch state. The multitouch is considered to have ended the flick gesture.

From the Drag Pending state there is an additional transition to the Multitouch state. This occurs if the user presses the touch surface with two fingers, the state machine generates a multitouch event and enters the Multitouch state.

From the Pressed state there is one additional transition. This occurs if the user presses the touch surface with two, or more, fingers, the state machine generates a multitouch event and enters the Multitouch state. Moreover, as stated above, if the user releases all but one finger, when in the Multitouch state, the state machine enters the Pressed state.

Figure 3:
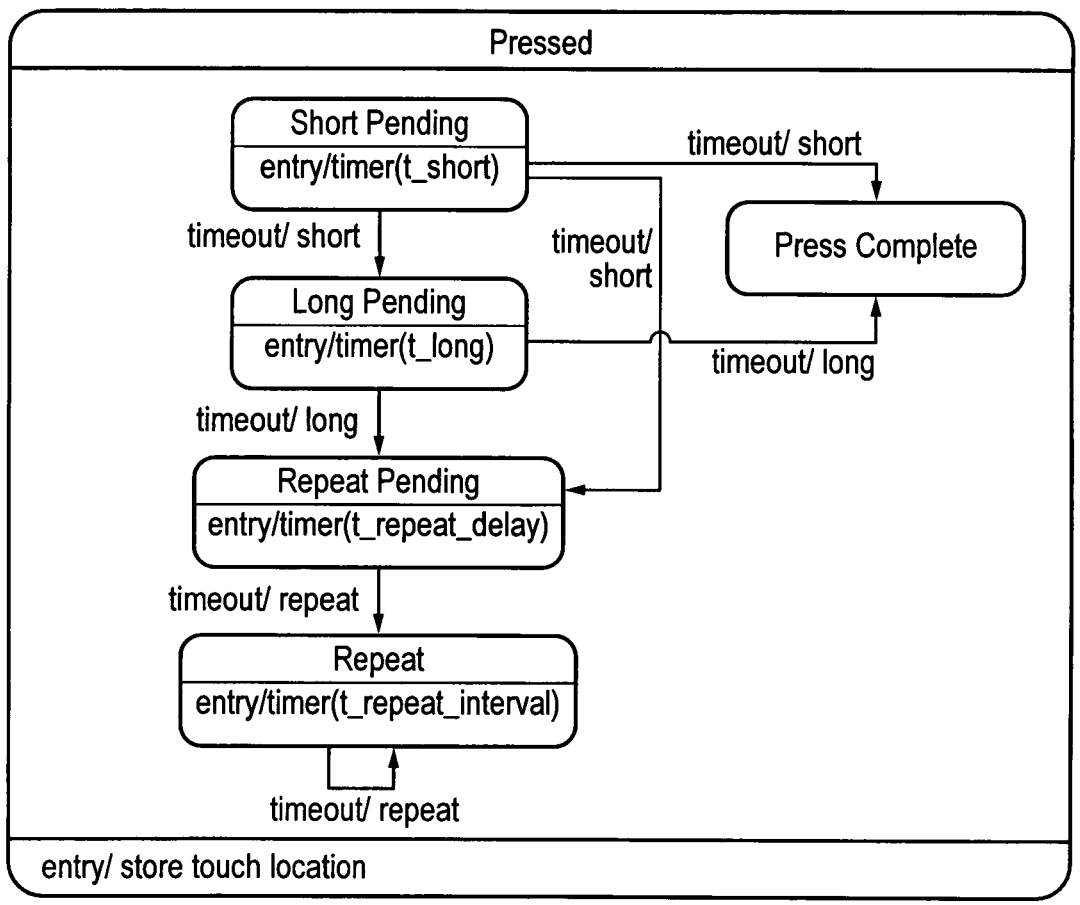
FIG. 3 illustrates features of a gesture recognition state machine according to a third embodiment.

FIG. 3 shows features of a state machine for gesture recognition according to a third embodiment, which may be viewed as a development of the second embodiment in which the Pressed state has been further developed. In this embodiment, the Pressed state is modified to be a superstate containing five states. The additional states are Short Pending, Long Pending, Repeat Pending, Repeat and Press Complete. These additional states allow multiple interpretations of a single touch depending on its duration.

The Short Pending state is an initial state of the superstate which is the one entered from other states of the state machine when a user has pressed the touch surface and been stationary for some time. On entry into the Short Pending state, a timeout is started, which is used to determine when to generate a short press event. The initial touch location is stored, and is used to decide if the user has moved their finger. While in the Short Pending state timeout expiry is checked, and the distance moved from the initial touch location is calculated. If the timeout expires, a short press event is generated and the state machine enters the Long Pending, Repeat Pending, Repeat, or Press Complete states. If the user moves by more than a specified distance from the initial touch location, a drag event is generated and the state machine enters the Drag Pending state. If the user releases their touch, the state machine generates a release event and enters the Idle state. If the user presses the touch surface with two fingers, the state machine generates a multitouch event and enters the Multitouch state. The timeout parameter in this state determines for how long the user's finger must be stationary before moving to the Long Pending, Repeat Pending, or Press Complete states. The movement parameter in this state determines by how much the user must move their finger to generate a drag event and enter the Drag Pending state. The maximum time permitted from initial touch to generate an event in this state is the sum of timeouts from the Touched, Flick Pending, Drag Pending and Short Pending states.

The Long Pending state is for when a user has pressed the touch surface and been stationary for some time. On entry a timeout is started. This is used to determine when to generate a long press event. The initial touch location on entry is stored. This is used to decide if the user has moved their finger. While in the state, the timeout expiry is checked and the distance moved from the initial touch location is calculated. If the timeout expires, a long press event is generated and the state machine enters the Repeat Pending or Press Complete states. If the user moves by more than a specified distance from the initial touch location, a drag event is generated and the state machine enters the Drag Pending state. If the user releases their touch, the state machine generates a release event and enters the Idle state. If the user presses the touch surface with two fingers, the state machine generates a multitouch event and enters the Multitouch state. The timeout parameter in this state determines for how long the user's finger must be stationary before moving to the Repeat Pending or Press Complete states. The movement parameter in this state determines by how much the user must move their finger to generate a drag event and enter the Drag Pending state. The maximum time from initial touch to generate an event in this state is the sum of timeouts from the Touched, Flick Pending, Drag Pending and Short Pending and Long Pending states.

The Repeat Pending state is for when a user has pressed the touch surface and been stationary for some time. On entry into the state, a timeout is started. This is used to determine when to generate a repeat press event. On entry, the initial touch location is also stored. This is used to decide if the user has moved their finger. While in the state, timeout expiry is checked and the distance moved from the initial touch location is calculated. If the timeout expires, a repeat press event is generated and the state machine enters the Repeat state. If the user moves by more than a specified distance from the initial touch location, a drag event is generated and the state machine enters the Drag Pending state. If the user releases their touch, the state machine generates a release event and enters the Idle state. If the user presses the touch surface with two fingers, the state machine generates a multitouch event and enters the Multitouch state. The timeout parameter in this state determines for how long the user's finger must be stationary before moving to the Repeat state. The movement parameter in this state determines by how much the user must move their finger to generate a drag event and enter the Drag Pending state. The maximum time from initial touch to generate an event in this state is the sum of timeouts from the Touched, Flick Pending, Drag Pending and Short Pending and Long Pending and Repeat Pending states.

The Repeat state is for when a user has pressed the touch surface and been stationary for some time. On entry, a timeout is started. This is used to determine when to generate a repeat press event. On entry, the initial touch location is also stored. This is used to decide if the user has moved their finger. While in this state, the timeout expiry is checked and the distance moved from the initial touch location is calculated. If the timeout expires, a repeat press event is generated. If the user moves by more than a specified distance from the initial touch location, a drag event is generated and the state machine enters the Drag Pending state. If the user releases their touch, the state machine generates a release event and enters the Idle state. If the user presses the touch surface with two fingers, the state machine generates a multitouch event and enters the Multitouch state. The timeout parameter in this state determines for how long the user's finger must be stationary before generating a repeat press event. The movement parameter in this state determines by how much the user must move their finger to generate a drag event and enter the Drag Pending state. The maximum time from initial touch to generate an event in this state is the sum of timeouts from the Touched, Flick Pending, Drag Pending and Short Pending and Long Pending, Repeat Pending and Repeat states.

The Press Complete state is similar to the Pressed state of the first and second embodiments. Namely, on entry, the initial touch location is stored. This is used to decide if the user has moved their finger. While in this state, the distance moved from the initial touch location is calculated. If the user moves by more than a specified distance from the initial touch location, a drag event is generated and the state machine enters the Drag Pending state. If the user releases their touch, the state machine generates a release event and enters the Idle state. If the user presses the touch surface with two fingers, the state machine generates a multitouch event and enters the Multitouch state. The movement parameter in this state determines by how much the user must move their finger to generate a drag event and enter the Drag Pending state. There is no limit on how long it could take before an event is generated in this state.

It will be understood that all the transitions illustrated in FIG. 3 relating to the Pressed superstate will not simultaneously be active. Each of the pressed sub-states can be disabled if required. The internal paths are then determined by which sub-states are enabled. For instance, if short press and repeat press are enabled, but long press is disabled, then a path into the superstate would go to the short pending sub-state. The long pending sub-state would then be skipped, and the machine would transition to the repeat pending sub-state.

It will be understood that the first embodiment could also be modified by incorporating a Pressed superstate the same as described above in relation to FIG. 3, but omitting the features relating to multitouch.

The state machines of the first, second and third embodiments are simple and effective, but do not scale well to more complex gesture combinations, in particular those that arise in multitouch. For instance, consider a gesture in which the user holds one finger on the touch surface and taps the surface with a second finger (a 'Press and Tap' gesture). To handle this, the 'multitouch' state in the state machine of the second embodiment would need multiple sub-states to track the position, duration, and movement of two touches.

It would also be difficult to extend the state machine of the second embodiment to handle gestures involving more than two touches. The state machine complexity would grow rapidly with each additional touch.

These limitations are overcome by a fourth embodiment of the invention according to which the multitouch state is removed from the state machine of the second embodiment to return to a simple single-touch state machine according to the first embodiment as shown in FIG. 1. A single-touch state machine of this kind can track all of the required information from a single touch. Multiple single-touch state machines are then combined to handle multiple touch gestures instead of creating a more complex multi-touch state machine following the approach of the second embodiment.

Figure 4:
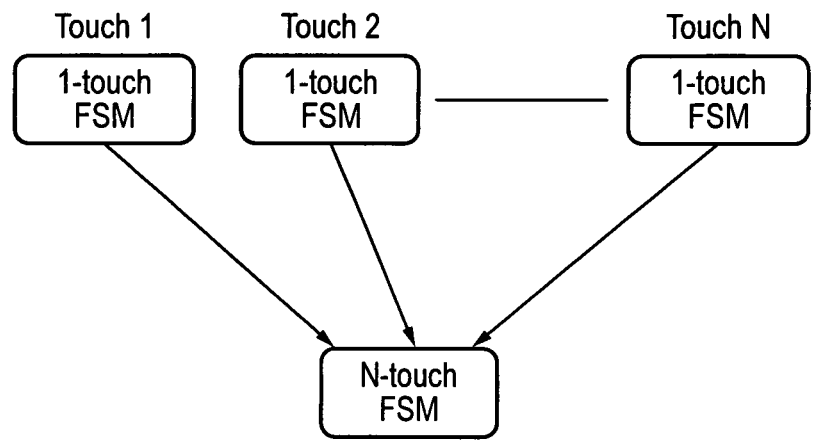
FIG. 4 illustrates a gesture recognition state machine according to a fourth embodiment for handling N touches.

FIG. 4 shows at its highest conceptual level a state machine according to the fourth embodiment. In this diagram, the 'Touch x' blocks each represent the single-touch state machine in FIG. 3. 'N' such state machines are processed by an N-touch state machine to generate N-touch gestures.

Figure 5:
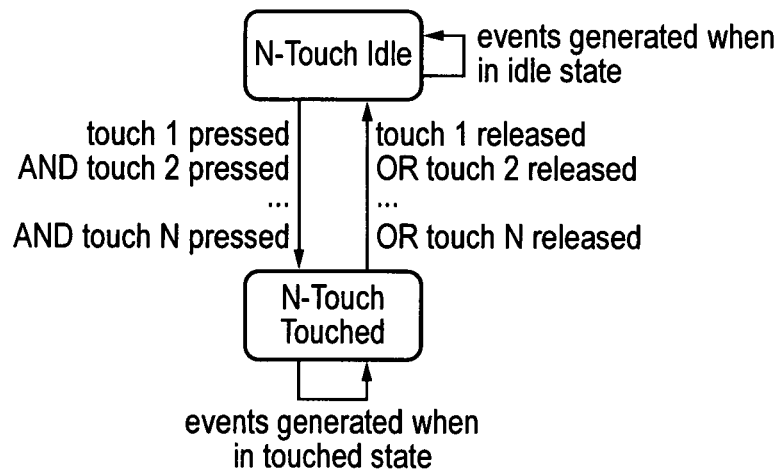
FIG. 5 illustrates internal states of an N-touch state machine according to the fourth embodiment.

FIG. 5 shows internal structure of the N-touch state machine of the second embodiment, which comprises idle and touched states. If all touches are pressed, the state machine is in the N-Touch Touched state, otherwise it is in the N-Touch Idle state. The state machine can generate events in either state. For instance, when in the N-Touch Touched state, if all of the 1-touch state machines are in the drag pending state, an N-Touch Drag event could be generated when any of them generate a Drag event.

Figure 6:
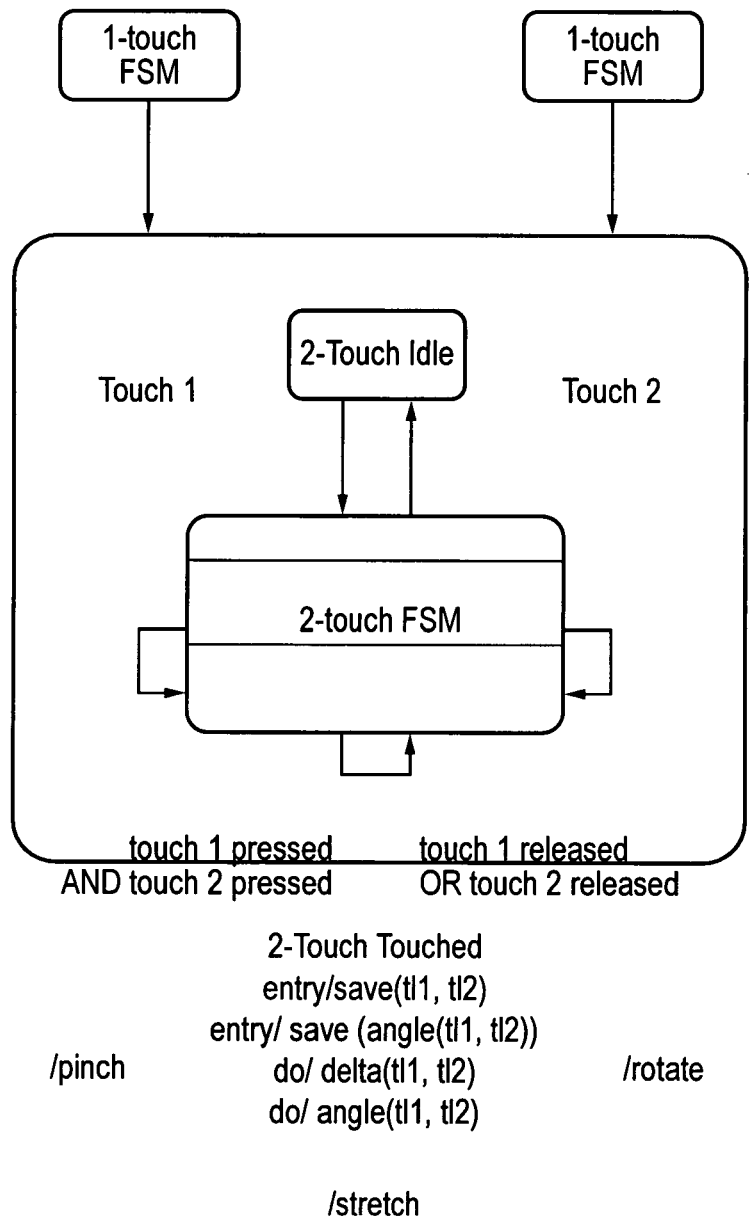
FIG. 6 is an example of the fourth embodiment showing generation of 2-touch events using two 1-touch state machines.

FIG. 6 shows how this approach can be used to give equivalent functionality to the state machine of the second embodiment shown in FIG. 2, but with a simpler scalable architecture.

In this example, Touch 1 and Touch 2 are processed by the 2-touch state machine, which tracks the separation and angle between the touches, and generates stretch, pinch, and rotate events as the distance and/or angle between the touches changes.

This state machine can also generate more complex gestures, such as the previously-described Press and Tap gesture. This can be done using a combination of the states and generated events of the two input state machines. If one state machine is in state 'Pressed' and the other has just generated a 'Tap' event, then the 2-touch state machine can generate a 'Press and Tap' event.

Similar combinations can be used to generate events such as:

Press and Double Tap
Drag and Tap
Press and Flick
Two Finger Drag
And any other combination of states and events.

Figure 7:
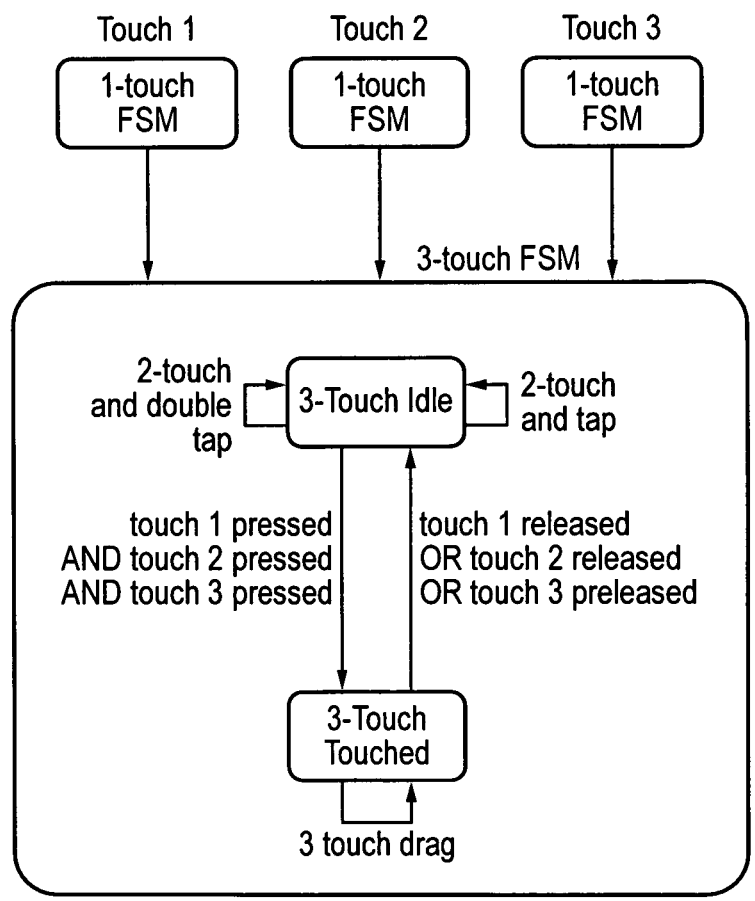
FIG. 7 is an example of 3-touch gesture handling according to the fourth embodiment.

FIG. 7 shows how the same approach can be used to handle three touch gestures. The figure shows three possible 3-touch gestures by way of example. When in the 3-Touch Touched state, if all of the 1-touch state machines are in the Drag Pending state, the 3-touch state machine could generate a 3 Touch Drag event when any 1-touch state machine generates a Drag event. The figure also shows how the state machine could detect a situation where the user has two touches on the touch surface, and then taps with a third finger. This could be used, for instance, in an application where two fingers are used to rotate a displayed image, and a tap with a third finger then zooms in on the displayed image. The same state machine could also easily detect a double tap to zoom back out.

A key advantage of the approach of the fourth embodiment is that the same code base is used for handling single touches, and 2-, 3- or if needed higher numbers of touches are processed using separate additional code. The approach is therefore scalable and modular with the usual benefits that brings in terms of saving of programmer time and reliability.

A suitable hardware platform for hosting a gesture recognition state machine according to the invention is now described. The hardware platform is taken from US 2007/0279395 A1, which was referred to in the introduction.

Figure 8:
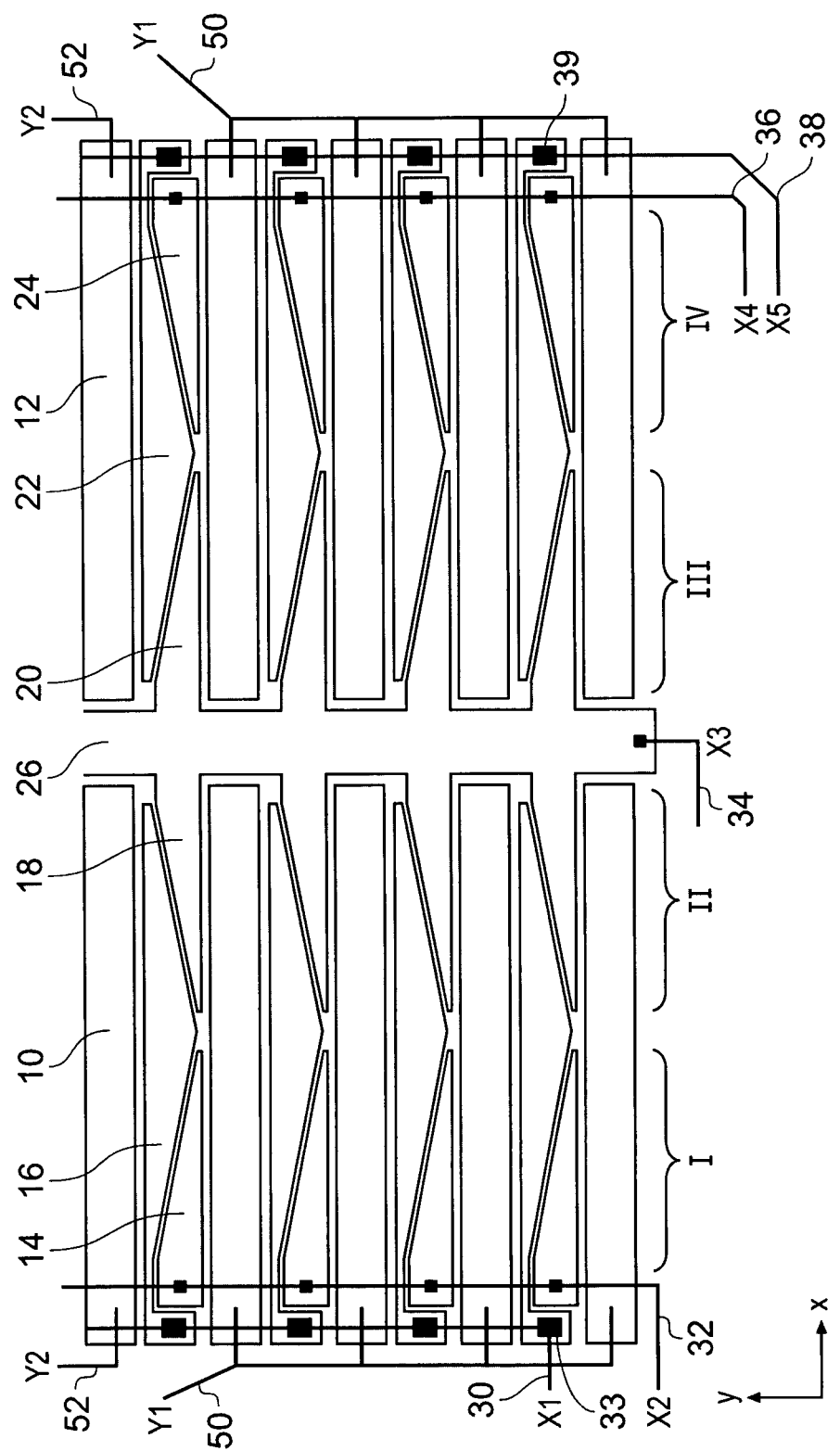
FIG. 8 is a schematic plan view showing parts of an electrode pattern for a two-dimensional capacitive touch screen (2DCT).

FIG. 8 is a schematic plan view showing representative parts of an electrode pattern for a 2DCT, wherein the electrode pattern define a sensitive area for the device. The electrodes are arranged on a substrate which is not expressly shown, but which has an upper surface lying in the plane of the paper. The substrate may conveniently be a flexible transparent plastics material such as polyethylene terephthalate (PET). The substrate will generally be insulating. The electrode pattern is made of indium tin oxide (ITO) having a resistivity of a few hundred ohm/square. This is a transparent material and thus suitable for display applications, or other applications where an underlying button or other template needs to be visible.

More generally, the electrode pattern can be made by depositing or removing any suitable conductive material. Deposition can be by vapor deposition or screen printing, for example. Removal can be by laser or chemical etching, for example.

The electrode pattern defines y-electrodes 10, 12 for determining y-position and x-electrodes 14, 16, 18, 20, 22, 24 for determining x-position. As illustrated, both the x-electrodes and the y-electrodes generally extend in the x-direction and are interleaved in the y-direction. The y-electrodes 10, 12 are shaped as simple bars, i.e. elongate rectangles, whereas the x-electrodes 14-24 have tapered triangular shapes.

The x-electrodes are first described in more detail. A description of the y-electrodes follows.

The x-electrodes can be classified into three groups. A first group of triangular tapered electrodes 14, 24 is arranged at the left and right hand sides of the sensitive area. A second group of triangular electrodes 16, 22 with double tapers is arranged so that the electrodes extend inwards from the left and right hand sides respectively of the sensitive area towards the centre. A third group of x-electrodes 18, 20 extend outwardly to the left and right respectively from a central spine 26 which are integrally formed. Adjacent ones of the elements of the first and second groups 14, 16 and 24, 22 co-extend in the x-direction over outer portions I and IV of the sensitive area towards the left and right sides of the sensitive area respectively. Adjacent ones of the elements of the second and third groups 16, 18 and 22, 20 co-extend in the x-direction over inner portions II and III respectively of the sensitive area either side of the central spine.

In this way each adjacent pair of co-extensive x-electrodes of the first and second or second and third groups forms a so-called slider. It will be appreciated that the electrode elements are suitably shaped and dimensioned in relation to the actuating device, typically a human finger, to provide a ratiometric capacitive signal spanning the length of their mutual extension in the x-direction, i.e. overlap in the x-direction.

The left-side double-tapered x-electrodes 16 are commonly connected to an external line X1 by a conductive electrical line 30 that runs in the y-direction at the left periphery of the sensitive area close to the leftmost edge of the x-electrodes 16. It is noted that the double-taper electrodes have a bonding pad areas 33 at their leftmost ends to facilitate this external connection.

The left-side tapered x-electrodes 14 are commonly connected to an external line X2 by a conductive electrical line 32 that runs in the y-direction at the left periphery of the sensitive area close to the leftmost edge of the x-electrodes 14.

The tapered x-electrodes 18 and 20 that depend from the central spine 26 are of course commonly connected by the spine and have electrical contact to the periphery of the sensitive area through the spine 26. An external line X3 connects to the central spine through an electrical line 34 contacted to the base of the spine 26.

The right-side tapered x-electrodes 24 are commonly connected to an external line X4 by a conductive electrical line 36 that runs in the y-direction at the right periphery of the sensitive area close to the rightmost edge of the x-electrodes 24 in similar fashion to the corresponding left-side x-electrodes 14.

The right-side double-tapered x-electrodes 22 are commonly connected to an external line X5 by a conductive electrical line 38 that runs in the y-direction at the right periphery of the sensitive area close to the rightmost edge of the x-electrodes 22 in similar fashion to the corresponding left-side x-electrodes 16 with the aid of enlarged bonding pad areas 39.

In this way, the x-electrodes 14-24 are externally contacted to five external lines X1-X5 for read out.

The y-electrodes are split into two sets 10 and 12 to the left and right of the central spine 26. As already mentioned, they have a simple bar shape and are arranged between each adjacent set of x-electrodes 14, 16, 18 on the left and 20, 22, 24 on the right. The y-electrodes 10 and 12 are connected in vertically adjacent sets by conductive electrical lines, so the y-resolution of the sensitive area is limited to a vertical distance corresponding to the vertical extent of the interconnected y-electrodes. This ganging together of the y-electrodes reduces the y-resolution, but is done to keep down the number of external lines needed for the y-electrodes. In the illustrated example, the bottom set of y-electrodes, consisting of four pairs of y-electrodes, are commonly connected to an electrically conducting track 50 that forms part of an external line Y1. Although not evident from this figure, each pair of y-electrodes at the same height are commonly connected by an external run-around track. The next set up consists of three pairs of y-electrodes, although only the first pair is visible, and is connected to a track 52 for a further external line Y2. In total there are seven sets of y-electrodes connected to respective external lines Y1-Y7 through associated conductive tracks. The y-value is taken from these seven external lines providing only 7 units of y-resolution for a simple control algorithm, although possibly additional y-resolution could be achieved with interpolation between adjacent y lines.

To summarize, the 2DCT provides quasi-continuous x-resolution through sliders arranged in four overlap regions I-IV in the x-direction spanning across the width of the sensitive area in combination with step-like y-resolution through horizontally extending electrode bars commonly connected in vertically adjacent sets of 3 and 4. In total 12 external lines are used, 5 for X and 7 for Y.

The combination of the central spine and the double-taper electrodes allows a large extent of the sensitive area in the x-direction to provide a large sensitive area that can be made transparent and free of external connections except at the periphery. Moreover, the electrode pattern design means that handshadow effects are not significant, since any shift in the centroid of the capacitive signal from the physical location of the finger is bounded by the lateral extent of the electrodes. For example, a device with a 6 inch (150 mm) diagonal sensitive area can be made to this design.

Figure 9:
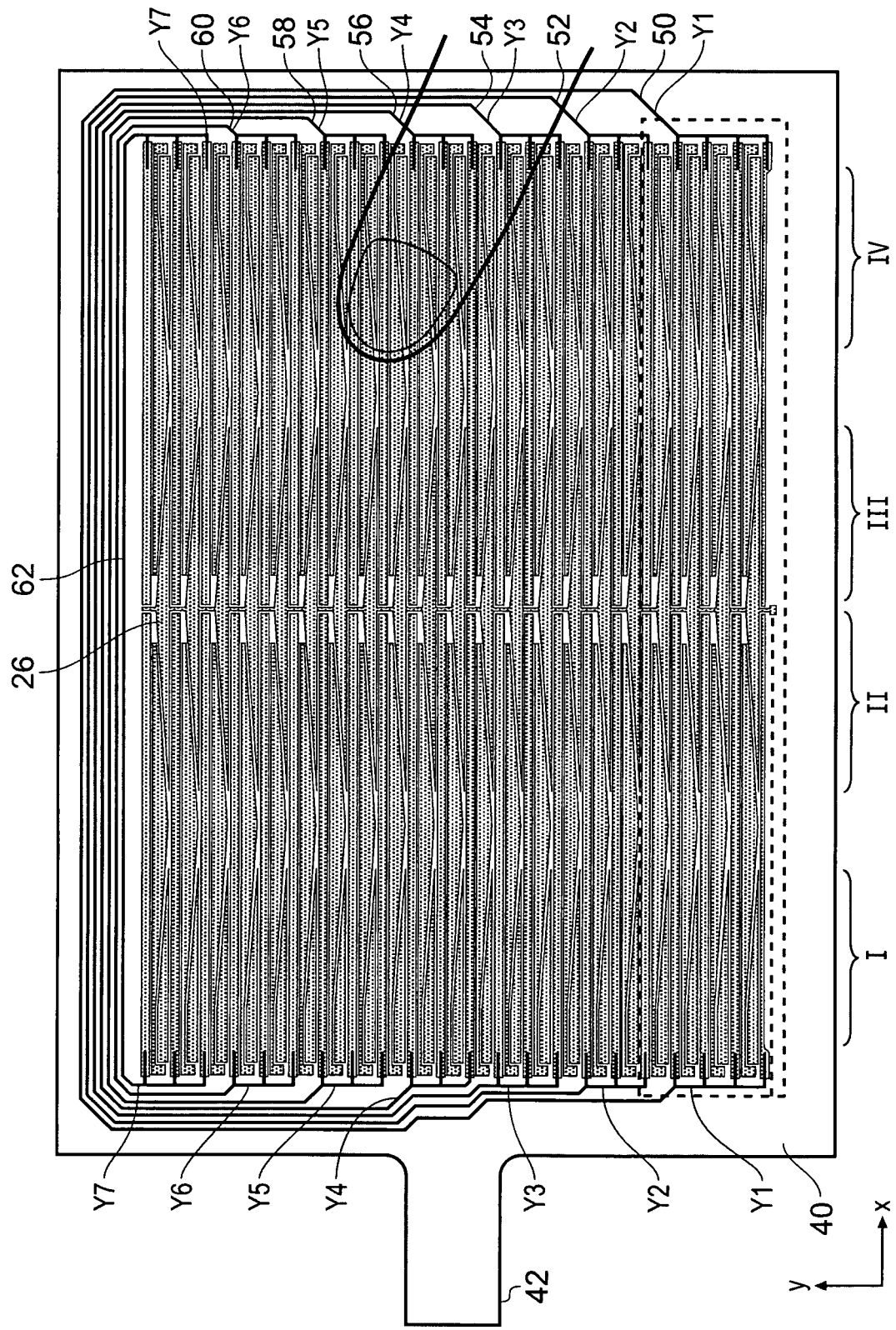
FIG. 9 is a plan view of a 2DCT of FIG. 8 showing the electrode pattern and a first layer of connections at the periphery of the electrode pattern area to connect to the y-electrodes.

FIG. 9 is a plan view to scale, with an approximate scale of 1:1—i.e. real size—of a 2DCT showing the electrode pattern and a first layer of connections at the periphery of the electrode pattern area to connect to the y-electrodes. For ease of reference, the area covered by the previous schematic figure is shown by the dotted rectangle at the bottom of the figure. A finger outline roughly to scale is also shown.

The general ITO electrode pattern is evident that covers the main part of the substrate 40. The pattern in this example covers a rectangular area which matches the area of the touch screen or other device which it is to form the sensing part. The previously described four overlap regions I-IV of the x-electrodes are also marked. The substrate 40, which is generally rectangular, also has a neck tab 42 mid way up the left side of the substrate. The neck tab 42 is used for external contacting as described with reference to a subsequent figure. On the left hand side of the substrate 40, the side adjacent the neck tab 42, it will be seen that there are seven groups of conducting tracks 50-62 forming external lines Y1-Y7 for the y-electrodes, with lines Y2-Y7 each being connected to three y-electrodes via the tracks 52-62 and Y1 connecting four y-electrodes via track 50, there being 22 y-electrodes in total on this left half of the device, i.e. the half to the left of the central spine 26. On the right hand side there is an exactly corresponding arrangement with 22 y-electrodes ganged in three's apart from at the bottom where four are ganged together. The tracks 50-62 of the external lines Y1-Y7 on the right hand side of the substrate run around the top of the substrate to the left hand side of the substrate so that the left and right side corresponding pairs, and commonly connected groups of pairs, of y-electrodes are joined by a single conductive track.

Figure 10:
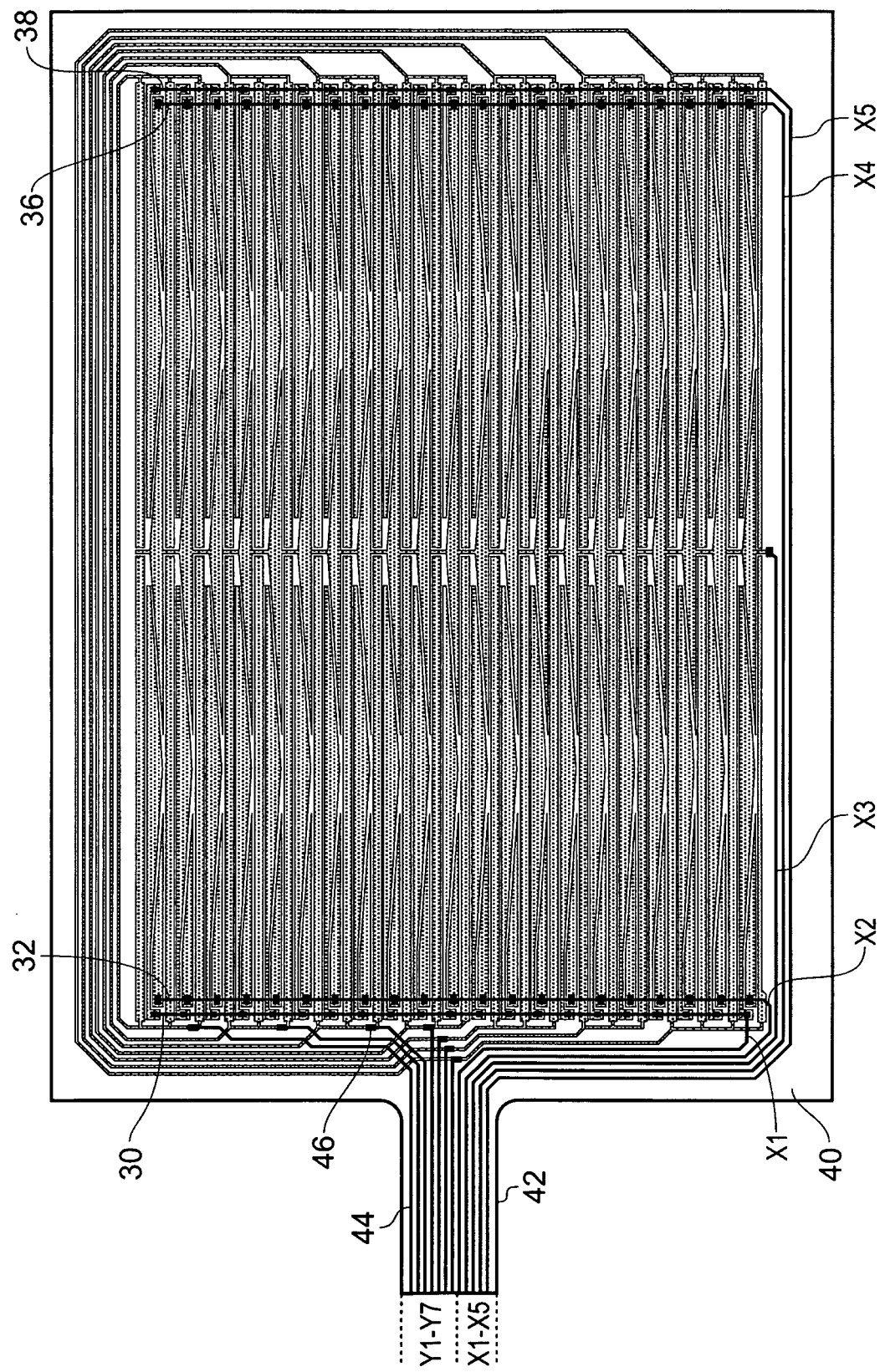
FIG. 10 is a plan view of the 2DCT of FIG. 9 showing the electrode pattern and a second layer of connections at the periphery of the electrode pattern area to connect to the x-electrodes and also to connect the y-electrode external feed lines to the y-electrode connections shown in FIG. 9.

FIG. 10 is a plan view of the 2DCT prototype of FIG. 9 showing the electrode pattern and a second layer of connections at the periphery of the electrode pattern area to connect to the x-electrodes and also to connect the y-electrode external feed lines to the y-electrode connections shown in FIG. 9. In between the first and second layers of FIGS. 9 and 10, there is interposed an insulating layer which provides insulating areas to prevent electrical contact between certain parts of the first and second connection layers and open areas to ensure electrical contact between certain other parts of the first and second connection layers.

The y-electrode connections are described first. Seven conductive tracks 44 extend in parallel in the x-direction along the upper part of the neck tab 42 onto the left side part of the main area of the substrate 40. They then fan out and terminate with an enlarged contact pad 46 directly above a part of the tracks 50-62 in the first connection layer of FIG. 9 for each of the y-electrode connections Y1-Y7 so that signals to and from each of the y-electrode groups can be fed in and out through the external contact tracks 44. There are open areas in the insulating layer at each contact pad 46 to ensure electrical contact between each of the Y1-Y7 tracks 44 on the second connection layer and the Y1-Y7 electrical line tracks 50-62 in the first connection layer. There are also insulating areas in the insulating layer covering each of the Y1-Y7 tracks where they overlie the ITO pattern to contact the y-electrodes both on the left and right hand sides of the substrate.

The x-electrode connections are now described. The five electrical lines 30-38 for external connections X1-X5 were already described with reference to FIG. 8 and can be seen in the second connection layer of the prototype in FIG. 11. As can be seen, the x-electrode connections are entirely provided for on the second connection layer, in contrast to the y-electrode connections which are distributed between the first and second connections layers. Namely, the tracks 30-38 run around the bottom side of the substrate 40 and then come together in 5 parallel tracks that are directed to the neck tab 42 where they join the 7 parallel y-electrode connections. It is noted that the x-electrode connection tracks and pads that run vertically up each side of the ITO area to contact the x-electrodes are electrically isolated from the y-electrode connection tracks by the insulating layer.

Figure 11:
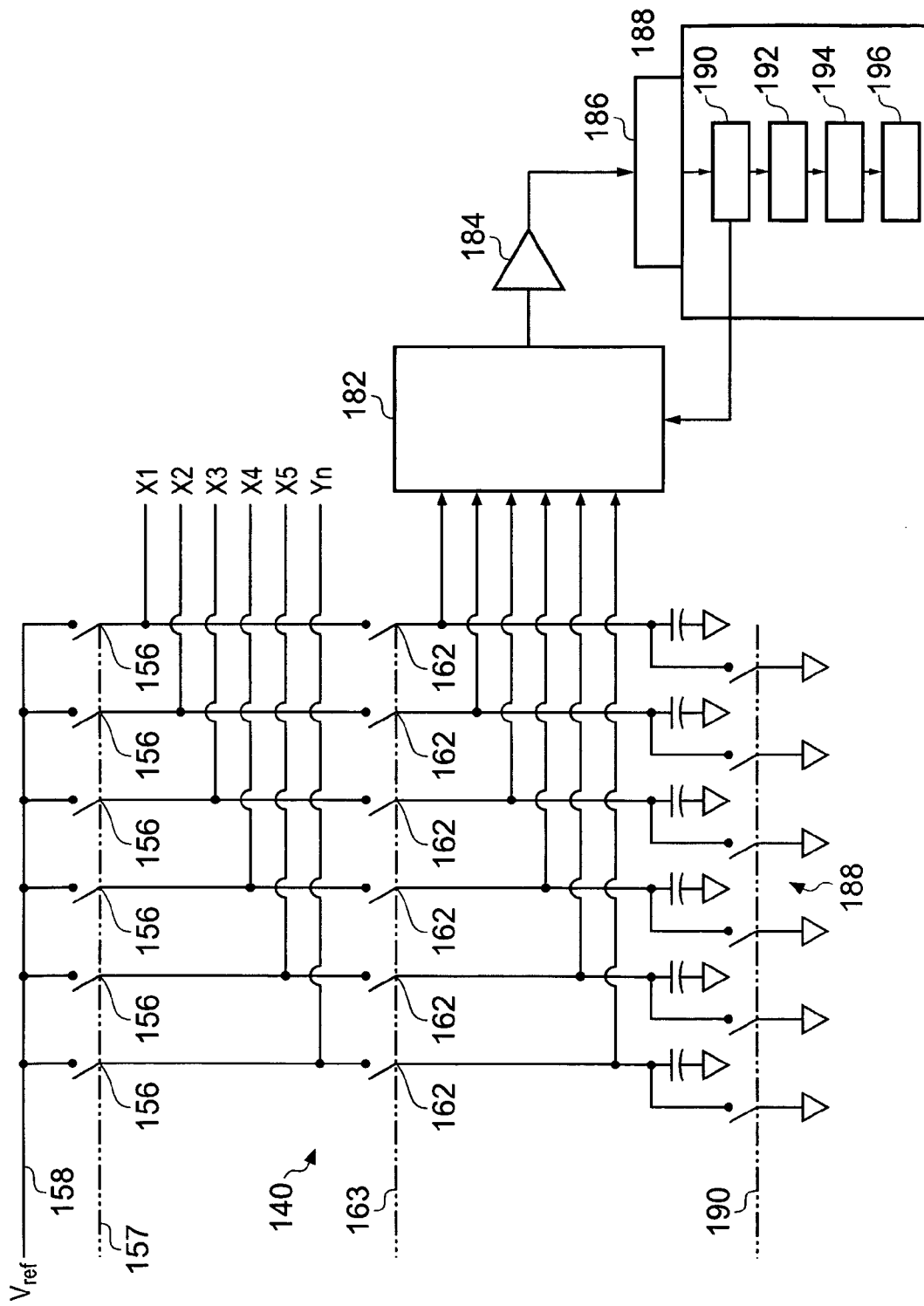
FIG. 11 is a schematic system level drawing of drive and data acquisition circuitry for the 2DCT of FIGS. 8-10.

FIG. 11 is a schematic system level drawing of a multi-channel sensor circuit 140 for use with the touch screen. In this figure the sensor circuit 140 is depicted as having five capacitive electrode inputs X1, X2, X3, X4 and X5 from the x-electrodes, and a single capacitive electrode input $Y_n$ representative of the seven y-electrode inputs. In reality there will be seven such lines, one for each y-electrode input to provide the required 12 lines in total. A charging control line 157 is used to simultaneously charge all the capacitive inputs X1-X5 and Y1-Y7 using charging switches 156 connected to a reference voltage rail 158.

The channels X1-X5 and Y1-Y7 act simultaneously when transferring charge to the charge detectors, as indicated in the figure, by the use of a single discharging control line 163 actuating discharge switches 162 to discharge all the charged electrodes. After the transfer, or burst of transfers, has occurred, an analogue multiplexer 182 selects which of the charge detector capacitor outputs is to be fed to the amplifier 184 and ADC 186.

Additionally, an array of reset switches 188 controlled by a reset control line 190 is activated after each pulse or burst of pulses to reset the capacitive inputs to a known reference (e.g., to ground). In respect of the x-channels X1-X5, these will need to be driven and the signals processed to take account of the ratiometric information that needs to be obtained from these signals.

Data processing then takes place on the digitized charge detector capacitor outputs. These outputs are input into a processing unit 188, which will include a microprocessor and optionally also a microcontroller for the lower level processing.

In a first processing stage or unit 190, referred to as the touch coordinate determination stage or unit, the digitized charge detector capacitor outputs are collated and interpreted as no, one or multiple simultaneous touches at defined x,y positions on the 2DCT for each repeat acquisition, frame or sampling interval. The touch coordinate determination stage or unit 190 has an output operable to control the analogue multiplexer 182 in order to cycle through the charge detector capacitor outputs, and thereby acquire the raw data from each of the x,y sensor node combinations. These data, i.e. the touch coordinates of each sample, are referred to as the touch data sets.

In a second processing stage or unit 192, referred to as the touch tracking stage or unit, the touch data sets for successive samples are analyzed, so that inputs that result from a single touch moving from sample-to-sample are identified as such, and distinguished from new touches and touches that have ceased. The data output from the touch tracking stage or unit are streams of x,y coordinates collated by time and particular touch tracked over time. These may conveniently be stored and/or represented in tabular form.

It is these data that are the input for a third processing stage or unit 194, referred to as the gesture recognition stage or unit, gesture recognition processing is carried out using the state machine code of the invention. The data output from the gesture recognition stage or unit are recognized gestures (including simple touches) and the times at or over which they occur.

In a fourth processing stage or unit 196, the recognized gesture data from the third stage is used in higher level code, typically at the application level, but in some cases at lower levels of the coding hierarchy. These gestures will be used to trigger higher level functionality, such as for the graphical user interface of the device, and to jump between code blocks of an application.

Further suitable capacitive touch sensing hardware platforms are described in US 2005/0041018 A1, US 2007/0247443 A1, and US 2007/0257894 A1, for example, which provide examples of passive capacitive sensors. Only one example is reproduced in this document for the sake of brevity.

Figure 12:
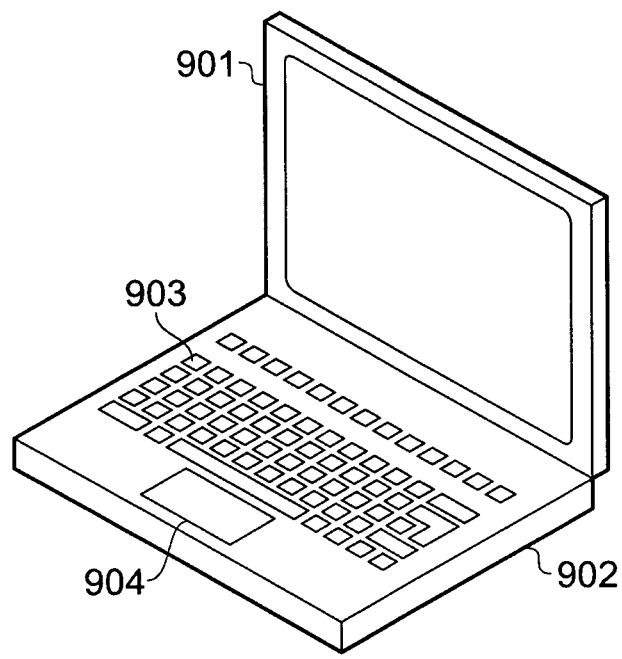
FIG. 12 schematically shows a display monitor and an input device according to the present invention.

FIG. 12 schematically shows the display monitor 901 and an input device 902 of a personal computer. In this example the input device 902 includes an alpha-numeric keyboard 903 for the user to input characters into the personal computer and a touchpad 904. It will be appreciated that the touchpad 904 could be a separate device to the keyboard 903. A conventional computer touchpad might also include a number of 'mouse-buttons' so that the user can operate a cursor, and select items by clicking one of said mouse-buttons. Although a conventional touchpad offers the possibility of moving a cursor on the display monitor by moving a finger over the touchpad's surface or as a mouse-button by tapping the touchpad's surface with a finger, the conventional touchpad cannot be used to perform both of these functions simultaneously. It will be appreciated that the personal computer could be contained within the display monitor 901 or the touchpad 904 could be one of the input devices of a laptop computer.

The touchpad 904 allows the user to use two separate fingers to operate two different functions of the personal computer. For example the user can move a cursor displayed on the display monitor 901 using one finger on the touchpad's surface, while using a separate finger to tap the surface of the touchpad 904, like a mouse-button, to select items. This could be used to organize data files, by first moving the cursor displayed on the display monitor 901 with a first finger on the touchpad's surface, until it is positioned over the required data file. The data file is selected by placing a second finger on the touchpad's surface. The data file is then moved to a different location by moving the first finger across the touchpad's surface, while the second finger is kept in contact with the touchpad's surface. When the data file is in the new desired location the second finger is removed from the touchpad's surface and the data file is deselected. It will be appreciated that in the above description, the second finger could also be moved at the same time as the first finger thus, allowing the user to carry out this function with one hand.

A further function which could be implemented is the ability to 'paint' using a personal computer, using a first finger as a brush and a second finger to select the required color from an on-screen palette. The first finger is used on the surface of the touchpad 904 to control a conventional primary cursor to draw an image on the computer, which is displayed on the display monitor 901. Implemented within the software and displayed on the display monitor 901 would be a palette of colors that can be readily selected. The user would move a secondary cursor over the required color of the palette, which could be selected using a 'tap' on the touchpad 904 using the second finger. The user could also use the secondary cursor to change the type of brush or the size of brush, in addition to the color in the method described above. This would allow the user more freedom when drawing an image, because the user could keep the primary cursor (brush) on the image at all times.

Figure 13:
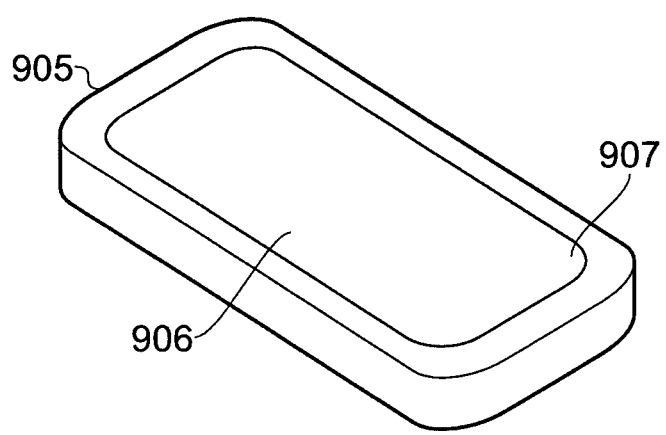
FIG. 13 schematically shows a cellular telephone according to the present invention.

FIG. 13 schematically shows a cellular telephone 905 incorporating a touchpad sensor 907 according to the present invention. The touchpad sensor is incorporated in front of the display screen 906 such that the display screen can still be viewed by the user, while still allowing capacitive coupling between the user's finger or stylus and the touchpad sensor 907. In this example, the user can select and move items displayed on the display screen by using a finger or stylus on the touchpad. The touchpad is incorporated with the display screen therefore, the 'cursor' will follow the movement of the user's finger or stylus. The same functions as those described for FIG. 12 above, could be applied to this example shown in FIG. 13.

Alternatively the touchpad 907 area could be divided up such that an area of the sensor was used to only view the display screen 906 and an area of the sensor was used only as a conventional touchpad sensor, whereby the user could move a cursor and select items, in the same manner described above.

A further function which could be implemented with the present invention is the control of a game on the cellular telephone 905. Although the touchpad 907 covers the same area as the display screen 906, it could be divided up such that there are user controls on the left and right of a central display area. The user would be able to use two fingers or thumbs, one on each of the left and right sides of the touchpad 907, such that he or she could control two different functions of a game. For example the left portion of the touchpad 907 could be a movement control including up, down, left and right and the right control portion of the touchpad 907 could be a series of buttons. For example this could be used in a driving game where the left and right movement controls on the left of the touchpad 907 are used to steer and the buttons on the right of the touchpad 907 are used to accelerate and slow down the vehicle in the game.

It will be appreciated that the personal computer and cellular telephone examples described above are described by way of example only, and that the invention can be applied to a wide variety of devices in the fields of consumer electronics, telecommunications, domestic appliances and automotive, for example.

In summary, it will be understood from the above that a capacitive touch panel can be provided which is capable of detecting multiple simultaneous touches which can be input into a gesture state machine according to the present invention.

What is claimed is:

1. A touch sensor device comprising:
 a sensor having a sensitive area extending in at least one-dimension and arranged to output sense signals responsive to proximity of an object to the sensitive area;
 a processor operable to execute position-processing logic stored in one or more tangible media, the position-processing logic, when executed by the processor, configured to:
  calculate positions of interactions with the sensitive area from an analysis of the sense signals; and
  output a times series of data indicative of the interaction positions on the sensor, the interaction positions corresponding to touches; and
 a processor operable to execute gesture-processing logic stored in one or more tangible media, the gesture-processing logic, when executed by the processor, configured to analyze the time series of data to distinguish one or more gesture inputs from the time series of data, the gesture-processing logic being coded with gesture-recognition code comprising a plurality of state-machine modules, the plurality of state-machine modules comprising:
- a first one-touch state-machine module, the first one-touch state-machine module being operable to recognize at least a first one-touch gesture and generate a first output based on the first one-touch gesture;
- a second one-touch state-machine module, the second one-touch state-machine module being operable to recognize at least a second one-touch gesture and generate a second output based on the second one-touch gesture; and
- a multi-touch state-machine module operable to:
  - receive, directly from the first one-touch state-machine module, the first output;
  - receive, directly from the second one-touch state-machine module, the second output; and
  - recognize, based on at least the first and second outputs, at least one multi-touch gesture, the first one-touch state-machine module, the second one-touch state-machine module, and the multi-touch state-machine module being distinct state-machine modules; and
  - output the recognized multi-touch gesture.

2. The device of claim 1, each of the plurality of state-machine modules including an idle-state module and a plurality of gesture-interpretation-state modules, the idle-state module being entered at the start of operation and being able to be returned to from at least some of the gesture-interpretation-state modules.

3. The device of claim 2, each of the plurality of gesture-interpretation-state modules for each of the one-touch state-machine modules including a touch-state module and the idle-state module passing, responsive to a touch, control to the touch-state module.

4. The device of claim 3, the plurality of gesture-interpretation-state modules for each of the first and second one-touch state-machine modules including a press-state module to which control can pass from a touch-state module if a touch of a duration longer than a threshold duration is sensed in the touch-state module.

5. The device of claim 4, the press-state being a super-state comprising multiple sub-states to distinguish between different durations of press.

6. The device of claim 2, the plurality of gesture-interpretation-state modules including a plurality of state modules operable to recognize motion-related gestures derived from one or more moving touches.

7. The device of claim 2, the plurality of gesture-interpretation-state modules for the multi-touch state-machine module including at least one multi-touch state-module operable to process multiple simultaneous touches based on the first and second outputs from the first and second one-touch state-machine modules, the gesture-processing logic being operable to pass control to the multi-touch state-machine module based on the number of simultaneous touches defined by the time series of data at the time.

8. The device of claim 7, wherein:
- the multi-touch state-machine module is for processing two simultaneous touches;
- and the device further comprises another multi-touch state-machine module for processing three simultaneous touches.

9. The device of claim 1, the gesture-recognition code being configured to recognize gestures having up to N simultaneous touches, N being at least 2, and comprising N one-touch state-machine modules operable to recognize only one-touch gestures and N−1 multi-touch state-machine modules each operable to recognize only n-touch gestures, wherein n=2 to N.

10. The device of claim 1, the position-processing logic and the gesture-processing logic being accommodated in, and run on, a single integrated circuit.

11. The device of claim 1, the position-processing logic being accommodated in, and running on, a first integrated circuit and the gesture-processing logic being accommodated in, and running on, one or more separate integrated circuits.

12. A method comprising:
- receiving a times series of data indicative of the interaction positions on a sensor, the interaction positions corresponding to touches;
- analyzing the time series of data to distinguish one or more gesture inputs from the time series of data using gesture-recognition code comprising a plurality of state-machine modules, the plurality of state-machine modules comprising:
  - a first one-touch state-machine module, the first one-touch state-machine module being operable to recognize at least a first one-touch gesture and generate a first output based on the first one-touch gesture;
  - a second one-touch state-machine module, the second one-touch state-machine module being operable to recognize at least a second one-touch gesture and generate a second output based on the second one-touch gesture; and
  - a multi-touch state-machine module operable to:
    - receive, directly from the first one-touch state-machine module, the first output;
    - receive, directly from the second one-touch state-machine module, the second output; and
    - recognize, based on at least the first and second outputs, at least one multi-touch gesture, the first one-touch state-machine module, the second one-touch state-machine module, and the multi-touch state-machine module being distinct state-machine modules; and
- outputting the recognized multi-touch gesture.

13. A single integrated circuit comprising:
- a memory element;
- a processor operable to execute logic stored in one or more tangible media, the logic, when executed by the processor, operable to:
  - receive a times series of data indicative of the interaction positions on a sensor, the interaction positions corresponding to touches;
  - analyze the time series of data to distinguish one or more gesture inputs from the time series of data, the gesture-processing logic being coded with gesture-recognition code comprising a plurality of state-machine modules, the plurality of state-machine modules comprising:
    - a first one-touch state-machine module, the first one-touch state-machine module being operable to recognize at least a first one-touch gesture and generate a first output based on the first one-touch gesture;
    - a second one-touch state-machine module, the second one-touch state-machine module being operable to recognize at least a second one-touch gesture and generate a second output based on the second one-touch gesture; and a multi-touch state-machine module operable to:
receive, directly from the first one-touch state-machine module, the first output;
receive, directly from the second one-touch state-machine module, the second output; and
recognize, based on at least the first and second outputs, at least one multi-touch gesture, the first one-touch state-machine module, the second one-touch state-machine module, and the multi-touch state-machine module being distinct state-machine modules; and
output the recognized multi-touch gesture.

14. A computer comprising:

a memory element;

a processor operable to execute logic stored in one or more tangible media, the logic, when executed by the processor, operable to:
receive a times series of data indicative of the interaction positions on a sensor, the interaction positions corresponding to touches;
analyze the time series of data to distinguish one or more gesture inputs from the time series of data using gesture-recognition code comprising a plurality of state-machine modules, the plurality of state-machine modules comprising:

a first one-touch state-machine module, the first one-touch state-machine module being operable to recognize at least a first one-touch gesture and generate a first output based on the first one-touch gesture;
a second one-touch state-machine module, the second one-touch state-machine module being operable to recognize at least a second one-touch gesture and generate a second output based on the second one-touch gesture; and
a multi-touch state-machine module operable to:
receive, directly from the first one-touch state-machine module, the first output;
receive, directly from the second one-touch state-machine module, the second output; and
recognize, based on at least the first and second outputs, at least one multi-touch gesture, the first one-touch state-machine module, the second one-touch state-machine module, and the multi-touch state-machine module being distinct state-machine modules; and
output the recognized multi-touch gesture.

* * * * *